3,003,883
METHOD OF CURING FRESH MEAT PRODUCTS
Irwin F. Levy, Brooklyn, N.Y., assignor to First Spice Manufacturing Corp., New York, N.Y., a corporation of New York
No Drawing. Filed Apr. 28, 1958, Ser. No. 731,112
5 Claims. (Cl. 99—159)

This invention relates to processed flesh meat products. In particular, it is directed to novel means of reducing shrinkage during the processing; and the products so produced.

Among the desiderata sought for in processed meat products, and cured meats which have been subjected to heating are: fine texture and appearance of the product; and reduction in shrinkage of the meat during the processing thereof.

I have discovered that it is possible markedly to reduce shrinkage in processing by including a magnesium salt as a component of the curing brine (in the case of brine-cured products), or as an additive to products referred to as "emulsion products" (frankfurters, bolognas, meat loaves, etc.) and also to improve the texture and appearance of cured meats. The primary curing agents are the customary nitrite and nitrate (potassium and/or sodium) in combination with sugar and salt.

Among the magnesium salts which are useful in effectuating the improvement above mentioned are: magnesium chloride, magnesium glutamate, magnesium monophosphate and other magnesium salts. These salts are water soluble. It will be understood, of course, that magnesium salts used are edible salts. If a magnesium salt is not soluble, per se, the solubility thereof can be effectuated by using solubilizing agents therefor, as for example, ethylenediaminetetraacetic acid (EDTA) and/or the edible salts thereof, such as any of the sodium or other edible salts of EDTA. Thus, magnesium phosphates which are, per se, insoluble or sparingly soluble in water, can be made soluble by the action of EDTA or the salts thereof as aforesaid, in consequence of the formation of a soluble magnesium complex with the EDTA or said salts thereof.

Thus, the presence of magnesium in soluble form due to its natural occurrence in magnesium-containing cooking salts, or the soluble magnesium provided by activating a hard water through the addition thereto of EDTA or a salt thereof can be taken advantage of in accordance with this invention.

The magnesium compounds are effective when used in an amount which provides at least 0.0075 percent (based on the magnesium content) with respect to the meat product. The magnesium may be employed in an amount that provides about 0.1 percent, preferably, up to about 0.5 percent.

In the preparation of brine-cured products, the brine is supplemented by the addition thereto of a magnesium salt. In the preparation of emulsion products the magnesium may be incorporated during the "chopping" operation.

The following are examples in accordance with this invention:

EXAMPLE 1

A brine is prepared with 1.25 pounds of common salt per gallon, plus 0.25 ounce of sodium nitrite, plus 0.32 ounce of sodium nitrate and 4 ounces of sugar.

To this conventional brine there is added 1 ounce of magnesium dihydrogen phosphate $(MgH_4(PO_4)_2 \cdot 3H_2O)$ per gallon.

10 sets of paired hams (lefts and rights) were then pumped with brine. One of each pair was pumped with the above conventional brine containing the added magnesium salt, while the other one of the pairs was pumped with the brine devoid of magnesium. All of the hams were pumped equal to 12 percent. The hams were then cured and smoked. After cooling the hams were weighed. Those hams pumped with the magnesium-containing brine showed 2 percent greater yield than the hams which had been pumped with the conventional brine.

The above sets of hams were sliced and compared for texture and appearance. The hams treated with the magnesium-containing brine showed a firmer, more uniform appearance, and seemed much drier on the cut surface than did the slices of the hams which had been pumped with the conventional brine.

It was also noted that the bite and mouth feel was much more appealing in the case of the magnesium-treated hams.

EXAMPLE 2

A brine was prepared with 1.25 pounds of common salt, 0.1 ounce of sodium nitrite, 1.12 ounces of potassium nitrate and 2 ounces of sugar per gallon of water. To this conventional brine there was added ⅔ ounce of magnesium chloride $(MgCl_2 \cdot 6H_2O)$.

10 sets of paired hams (lefts and rights) were treated, by pumping the same with brine. One of each pair was pumped with the above conventional brine, which had been supplemented by the magnesium salt, while the mate thereof was pumped with the conventional brine.

All hams were pumped equally to 12 percent.

The hams were cured and then boned, put into cooking molds and cooked in the customary manner. After cooling the hams were taken out of the molds and were weighed. The hams pumped with the magnesium-containing brine showed 2.3 percent greater yield than the hams which had been pumped with the conventional brine.

The above sets of hams were sliced and compared for texture and appearance. The hams treated with the magnesium-containing brine showed a firmer, more uniform appearance on the cut surface than did the slices from the hams which had been prepared with the conventional brine. It was noted here, again, that the bite and the mouth feel was much more appealing in the case of the magnesium-treated hams.

EXAMPLE 3

A brine was prepared with 1.25 pounds of unrefined rock salt per gallon of water plus 0.25 of an ounce of sodium nitrite and 0.32 of an ounce of sodium nitrate and 4 ounces of sugar. To this brine there was added the sodium salt of EDTA equi-molar in amount to the magnesium in the rock salt. This was brine "A."

A second brine was prepared, in the same manner, using 1.25 pounds of common salt with the same proportions of nitrite, nitrate and sugar. This was brine "B."

Ten sets of pairs of hams, lefts and rights, were pumped. One of each pair was pumped with brine "A" and the mate thereof was pumped with brine "B." All hams were pumped equally to 12 percent. The hams were then smoked. After cooling, the hams were weighed. Those treated with brine "A" showed ½ percent greater yield than the hams which had been pumped with brine "B."

EXAMPLE 4

A brine was prepared with 1.25 pounds of common salt per gallon of water, plus 0.1 ounce of sodium nitrite and 1.12 ounces of sodium nitrate and 2 ounces of sugar. 12-grain hardness water was used to make this brine. An equi-molar amount of the sodium salt of EDTA in relation to the total of the magnesium contained in the water was added to this brine.

A second brine was made, using the same formulation as above except that the hard water was first demineralized.

Ten sets of pairs of hams were pumped, right and left, respectively, with the first and the second brines. The hams were then smoked. After cooling the hams were weighed. The hams pumped with the hard water containing the EDTA showed ½ percent greater yield than the hams which had been pumped with the demineralized hard water.

EXAMPLE 5

*Frankfurters, bolognas, loaf and other emulsion products*

An emulsion product was prepared in accordance with the classic recipe of 60 percent bull meat and 40 percent pork trimmings, together with the customary addition of cure, salts, seasoning, moisture and binder.

To 100 pounds of the above emulsion, 1 ounce of magnesium dihydrogen phosphate, aforesaid, was added just prior to the addition of the pork trimmings. The emulsion was stuffed into casings, smoked, cooked and showered in the conventional manner.

The above procedure was duplicated on another batch, using the same quantities of ingredients, with the exception that no magnesium dihydrogen phosphate was added.

Both batches were then smoked at the same time.

On weighing each of the batches it was found that there was a 3 percent greater yield in the lot to which the magnesium had been added.

It will be understood that the foregoing description of this invention and the examples set forth are merely illustrative of the principles thereof. Accordingly, the appended claims are to be construed as defining the invention within the full spirit and scope thereof.

I claim:

1. In the curing of flesh meat products the method of increasing the yield thereof which comprises curing the meat with a combination consisting essentially of conventional curing ingredients and a water-soluble edible magnesium compound whereof the magnesium compound imparts a magnesium content to the cured meat in the approximate range of 0.0075 to 0.5%.

2. Method according to claim 1 wherein the magnesium compound is magnesium dihydrogen phosphate.

3. Method according to claim 1 wherein the magnesium compound is magnesium chloride.

4. Method according to claim 1 wherein the magnesium compound is a complex of a magnesium compound and ethylenediaminetetracetic acid or a salt thereof.

5. A cured flesh meat product obtained by the method of claim 1.

References Cited in the file of this patent

UNITED STATES PATENTS

| 36,735 | Spencer | Oct. 21, 1862 |
| 868,566 | Hughes | Oct. 15, 1907 |
| 1,998,179 | Wolf | Apr. 16, 1935 |
| 2,031,243 | Wolf | Feb. 18, 1936 |
| 2,355,548 | Musher | Aug. 8, 1944 |
| 2,528,204 | Zwosta | Oct. 31, 1950 |

FOREIGN PATENTS

| 554,025 | Great Britain | June 16, 1943 |